United States Patent [19]

Park

[11] Patent Number: 5,603,296
[45] Date of Patent: Feb. 18, 1997

[54] INTAKE APPARATUS OF AN ENGINE

[75] Inventor: Byungyol Park, Kyunggi-Do, Rep. of Korea

[73] Assignee: Daewoo Motor Co., Ltd., Incheon, Rep. of Korea

[21] Appl. No.: 586,799

[22] PCT Filed: May 30, 1995

[86] PCT No.: PCT/KR95/00067

§ 371 Date: Jan. 22, 1996

§ 102(e) Date: Jan. 22, 1996

[87] PCT Pub. No.: WO95/33129

PCT Pub. Date: Dec. 7, 1995

[30] Foreign Application Priority Data

May 31, 1994 [KR] Rep. of Korea ................. 94-12545 U
Jul. 30, 1994 [KR] Rep. of Korea ................. 94-19322 U

[51] Int. Cl.⁶ ........................................... F02B 27/02
[52] U.S. Cl. ............................... 123/184.55; 137/468
[58] Field of Search ................ 123/184.55, 184.53, 123/184.56; 137/468; 403/28, 30

[56] References Cited

U.S. PATENT DOCUMENTS

| 451,388 | 4/1985 | Heimovics | 137/468 |
| 3,521,662 | 7/1970 | Bache | 137/468 |
| 4,793,372 | 12/1988 | Gauthier et al. | 137/468 |
| 5,033,417 | 7/1991 | Van Basshuysen et al. | 123/184.55 |
| 5,048,469 | 9/1991 | Spray | 123/184.55 |
| 5,105,774 | 4/1992 | Piccini | 123/184.55 |
| 5,143,026 | 9/1992 | Brustle et al. | 123/184.55 |

*Primary Examiner*—Marguerite McMahon
*Attorney, Agent, or Firm*—Lowe, Price, LeBlanc & Becker

[57] ABSTRACT

An intake apparatus of an engine(13) wherein an intake section(12) into which air flows from air cleaner is provided within an intake manifold(11), and a partition wall(16) defining a short intake passage(17) and a long intake passage(18) separately is installed concentrically with a circular intake manifold casing(15) with respect to the intake section(12), between the intake manifold casing(15) and the intake section(12). An intake control valve(20) is switchably arranged between an upper end(16a) of the partition wall(16) and a bent portion(14a) of the intake manifold(11). At least two unit shafts are spaced apart from and connected with each other to form a shaft(23) to which the intake control valve(20) is fixed. A driving mechanism(31) for driving the intake control valve(20) comprises an actuator(32) energized by a solenoid valve(41), a rod(33) connected to the actuator(32) and a lever(35) rotatably connected at its one end to the rod(33) by means of a pin and secured at its other end to the shaft(23).

5 Claims, 7 Drawing Sheets

INTAKE APPARATUS OF AN ENGINE

TECHNICAL FIELD

The present invention relates to an intake apparatus of an engine, and more particularly to an improved arrangement of an intake control valve for switching intake passages in the intake manifold, and a driving mechanism for driving the intake control valve.

BACKGROUND ART

Generally, it is well known that the output performance of an engine according to the revolutions of the engine depends upon the length of intake passage formed in the intake manifold, that is, in case that the intake passage is made long, the output performance of the engine at low speed is raised due to the pulse effect of air, and where the intake passage is made short, the output performance of the engine at high speed is enhanced due to the inertia force of air.

Thus, there has been proposed an intake apparatus of an engine which is capable of enhancing the output performance of the engine by making the length of the intake passage of the intake manifold changeable and changing the length of the intake passage in accordance with the change of revolutions of the engine.

Figure 2:
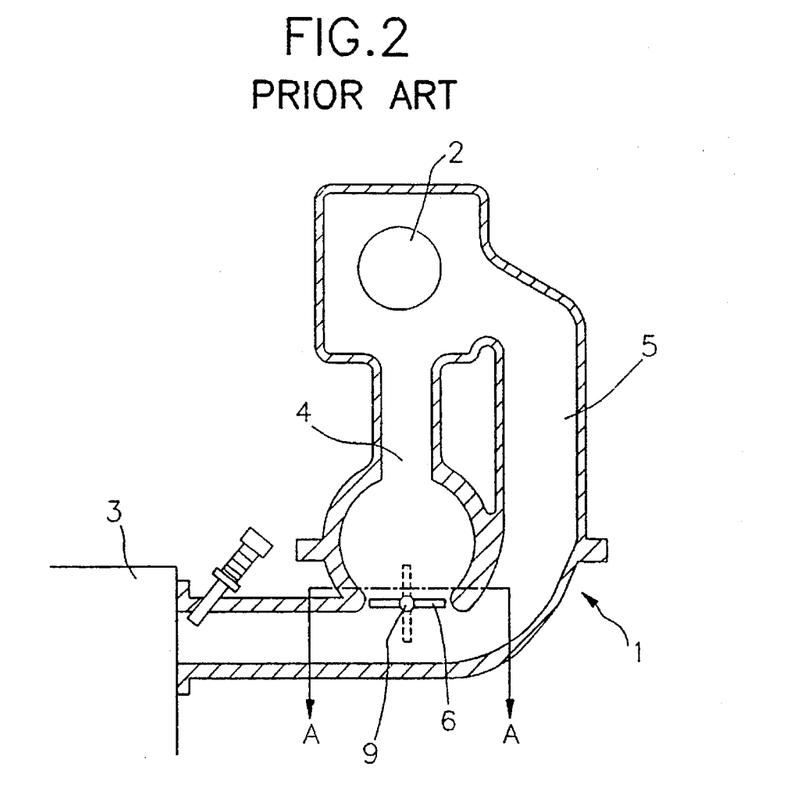
FIG. 2 is a schematic longitudinal sectional view of a conventional intake manifold.

In a conventional intake apparatus, as shown in FIG. 2, both a short intake passage 4 and a long intake passage 5 are separately provided within an intake manifold 1 to form intake passages each of which extends from an intake section 2 to an intake port of an engine 3, and an intake control valve 6 is installed in the course of the short intake passage 4 in such a manner that the intake control valve 6 may be switched to close or open the intake passage 4 in accordance with the revolutions of the engine 3, thereby to allow air to flow into the engine 3 through the short intake passage 4 or the long intake passage 5. However, such a conventional intake apparatus has defects in that the long intake passage 5 is largely outwardly bent between the intake section 2 and the engine 3, and therefore the volume of the apparatus as a whole is bulky, and in that the quick response to rapid acceleration or rapid deceleration of an automobile deteriorates.

Figure 1:
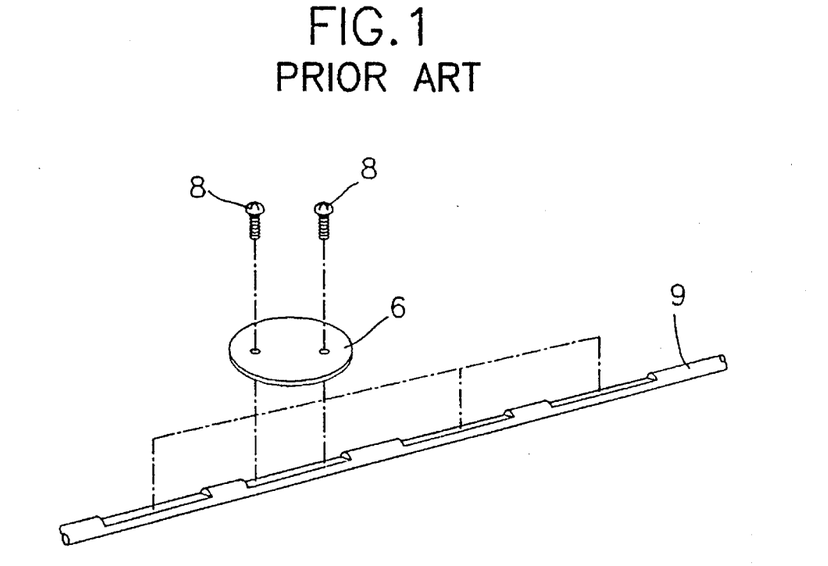
FIG. 1 is a perspective view of a conventional intake control valve shaft.
Figure 3:
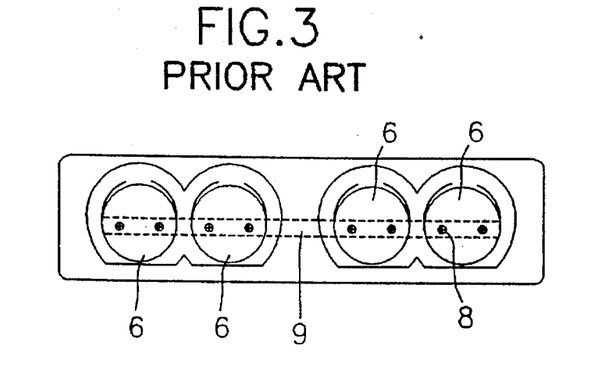
FIG. 3 is a sectional view of the conventional intake manifold, taken along line A—A of FIG. 2.
Figure 4A:
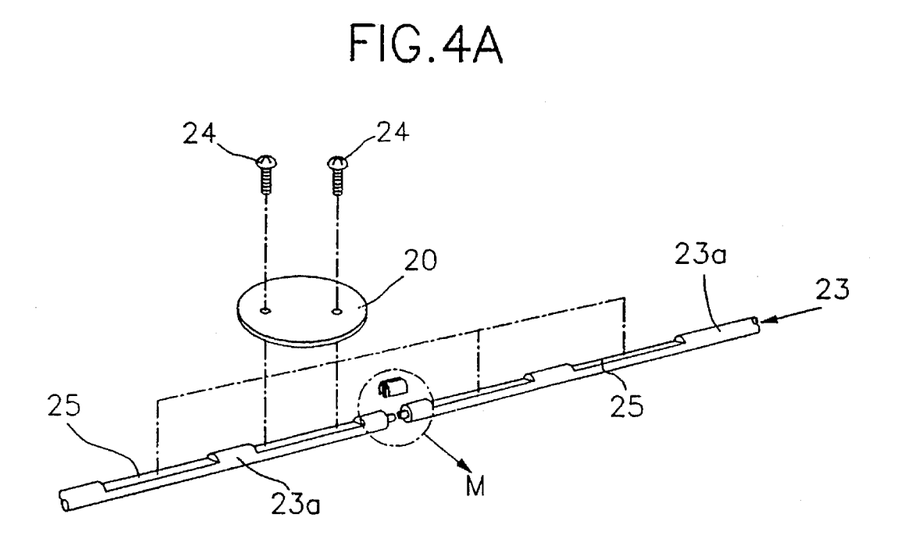
FIG. 4A is a perspective view of an intake control valve shaft according to the present invention.
Figure 4B:
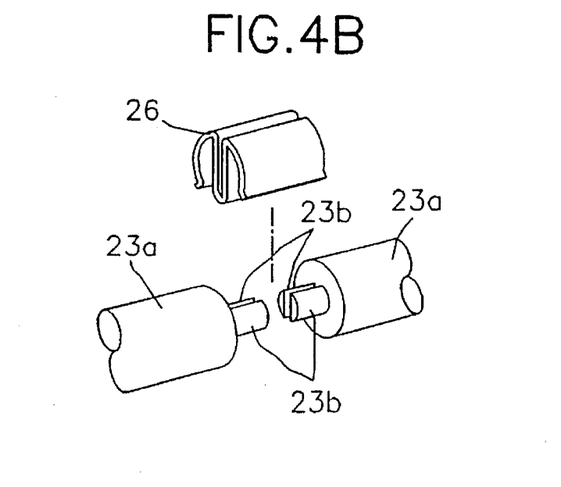
FIG. 4B is an enlarged perspective view of M of FIG. 4A.
Figure 5A:
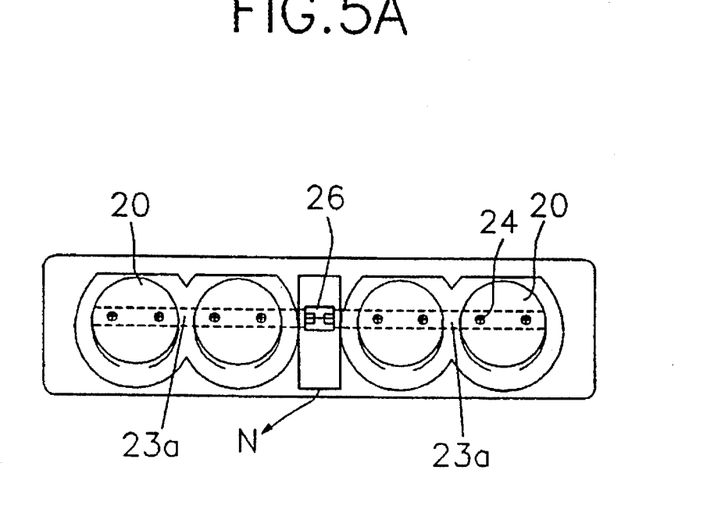
FIG. 5A is a sectional view showing that the intake control valve shaft according to the invention is installed in an intake passage, similar to FIG. 3.
Figure 5B:
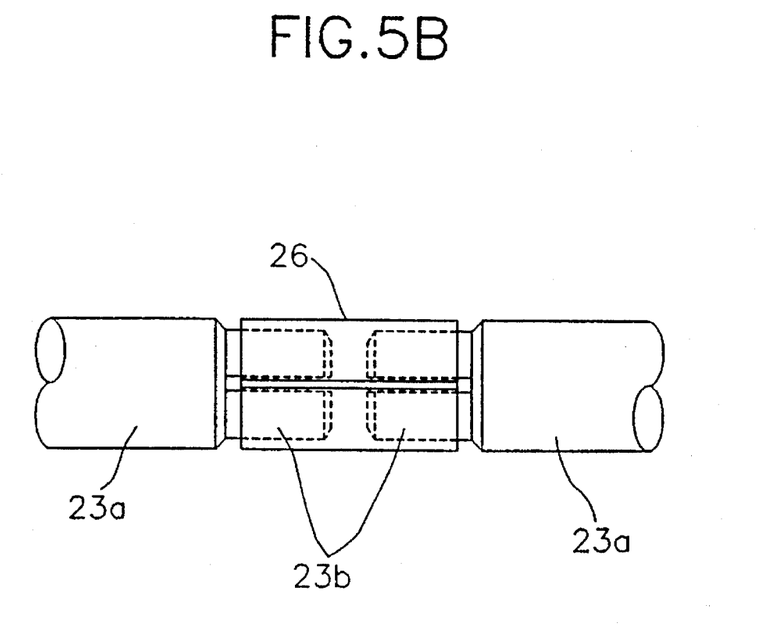
FIG. 5B is an enlarged view of N of FIG. 5A.

Meanwhile, the intake control valve 6 is, as shown in FIGS. 1 and 3, secured to a shaft 9 by means of, for instance, screws 8, and the shaft 9 is actuated by an actuator (not shown) in response to the operating condition of the engine so as to switch the intake control valve 6 between the long intake passage 5 and the short intake passage 4, thereby to allow air to flow from the intake section 2 into the engine through the long intake passage 4 or the short intake passage 5.

However, where the conventional shaft 9 shown in FIG. 1 is thermally expanded due to high temperature of engine, the intake control valve 6 contacts and interferes with the inner surface of the intake manifold 1, and as a result, the intake control valve 6 does not operate smoothly. Also, the conventional apparatus is disadvantageous in that a driving mechanism for driving the shaft is complex.

DISCLOSURE OF INVENTION

The present invention aims to solve the abovementioned problems raised in the conventional art.

It is therefore an object of the present invention no provide an apparatus of an engine with concise structure which is capable of changing the length of intake passage of an intake manifold, in accordance with the revolutions of the engine.

Another object of the invention is to provide an apparatus of an engine in which an intake control valve shaft can absorb the thermal expansion due to high temperature of the engine.

A further object of the invention is to provide an apparatus of an engine wherein a driving mechanism for driving an intake control valve is made compact.

To achieve these objects, an intake apparatus of the present invention is characterized in that an intake section into which air flows from air cleaner is provided within an intake manifold, a partition wall is installed concentrically with an intake manifold casing surrounding the intake section with respect to the intake section, between the intake manifold casing and the intake section in order to define a first intake passage and a second intake passage separately, the first and second intake passages having different lengths from each other, and an intake control valve is switchably arranged between an upper end of the partition wall and a bent portion of the intake manifold so as to allow air to flow from the intake section into the engine through the first intake passage or the second intake passage.

And, the intake apparatus of the present invention is characterized in that at least two unit shafts are spaced apart from and connected with each other by means of a coupler to comprise a shaft to which the intake control valve is fixed, thereby to absorb axial thermal expansion of the shaft due to the high heat of the engine.

Further, a driving mechanism for driving an intake control valve according to the present invention comprises an actuator activated by a solenoid valve, a rod connected to the actuator to move axially and a lever rotatably connected at its one end to the rod by means of a pin and secured at its other end to the shaft.

By the present invention, it is possible to manufacture an intake apparatus of an engine with simple structure having an intake control valve capable of changing the length of intake passages in the intake manifold. And, since the thermal expansion of the shaft due to high temperature of the engine can be absorbed, a reliable operation of the intake control valve is secured. Also, the driving mechanism for driving the intake control valve can be made concise and compact.

BRIEF DESCRIPTION OF DRAWINGS

The above objects and other features of the present invention will be more apparent by describing the preferred embodiment thereof referring to the accompanying drawings, in which.

BEST MODE FOR CARRYING OUT THE INVENTION

Figure 6:
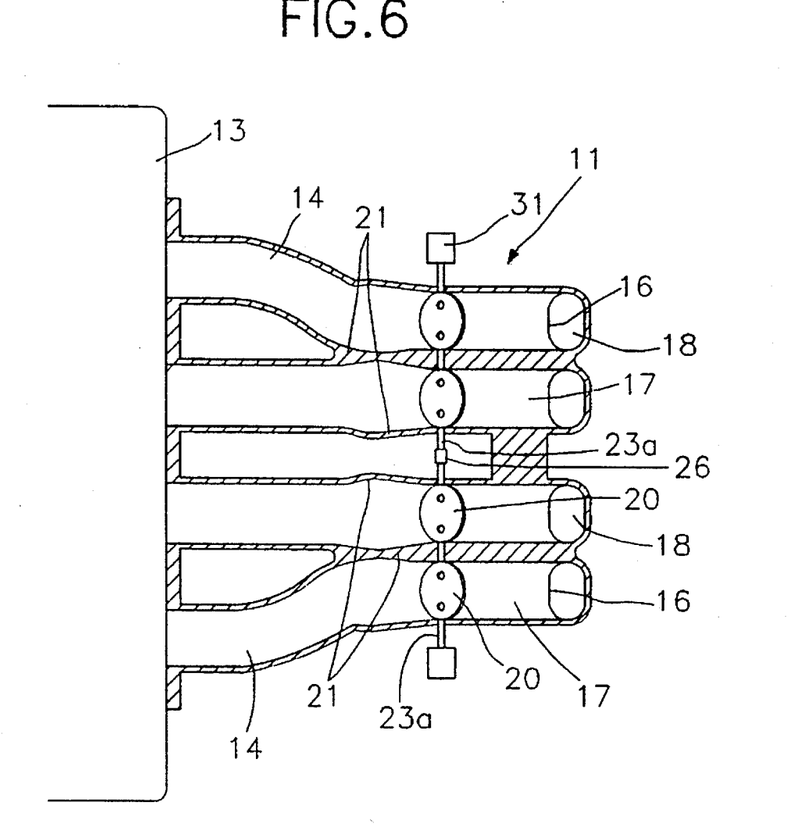
FIG. 6 is a cross sectional view of an intake apparatus of an engine according to the present invention.
Figure 7:
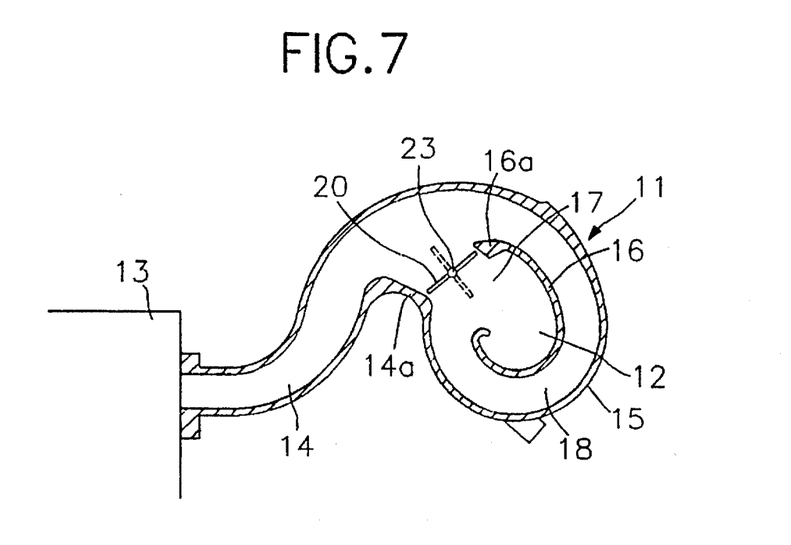
FIG. 7 is a longitudinal sectional view of the intake apparatus according to the present invention.

FIGS. 6 and 7 are a cross-sectional view and a longitudinal-sectional view of an intake apparatus of an engine according to one embodiment of the present invention, respectively. In FIG. 7, an intake manifold 11 is formed with an intake section 12 into which air flows from an air cleaner (not shown) and with a connecting passage 14 connected to the intake section 12 at its one end and to an engine 3 at its other end. A casing 15 of the intake manifold 11 surrounding the intake section 12 is substantially circular-shaped, and a curved partition wall 16 is arranged concentrically with the casing 15 with respect to the intake section 12 in the intake manifold 11. The interior space of the casing 15 is divided into a first intake passage 17 communicating directly with the intake section 12 and a second intake passage 18 defined around the periphery of the first intake passage 17, by means of the partition wall 16. Between an upper end 16a of the partition wall 16 and a bent portion 14a of the connecting passage 14 is a disc-type intake control valve 20 installed rotatably in order to allow or block direct air-flow from the intake section 12 into the connecting passage 14. When the intake control valve 20 is in the opened state, air flows from the intake section 12 via the first intake passage 17 directly into the connecting passage 14, whereas when the intake control valve 20 is in the closed state, air flows from the intake section 12 via the second intake passage into the connecting passage 14. As shown in FIG. 6, both the connecting passage 14 and the intake passages 17 and 18 are latitudinally divided into a plurality of connecting passages 14 and intake passages 17 and 18, respectively, by means of a plurality of division walls 21. Accordingly, a plurality of intake control valves 20 should be provided in the intake manifold 11. That is, each intake control valve 20 is disposed in each intake passage 17, and each of the divided connecting passages 14 is connected to the corresponding intake port of the engine 13. And, each of the second intake passages 18 divided by the division wall 21 is communicated with the connecting passage 14 at one end thereof and with the intake section 12 at the other end thereof.

Referring to FIGS. 4A to 7, each of the intake control valves 20 is secured to a seat 25 formed on a shaft 23 by means of, for instance, screws 24. According to the features of the present invention, the shaft 23 comprises at least two unit shafts 23a spaced apart from each other. Each of the unit shafts 23a is provided at one of the opposite ends thereof with a connection portion having a pair of semicircular protrusions 23b which are apart from each other. The connection portion of one unit shaft 23a is connected to an adjacent connection portion of adjacent unit shaft 23a with a pre-determined gap by means of coupler 26 so as to absorb an axial thermal expansion of the shaft 23 caused by high temperature of the engine 13. Since a plurality of unit shafts 23a are firmly connected together by the coupler 26, the shaft 23 comprised of the unit shafts 23a can be rotated by a driving mechanism 31 for driving the intake control valve 20 so that first intake passage 17 can be opened or closed.

Hereinafter, description of the intake control valve driving mechanism 31 will be given, with reference to FIGS. 8 to 10.

Figure 8:
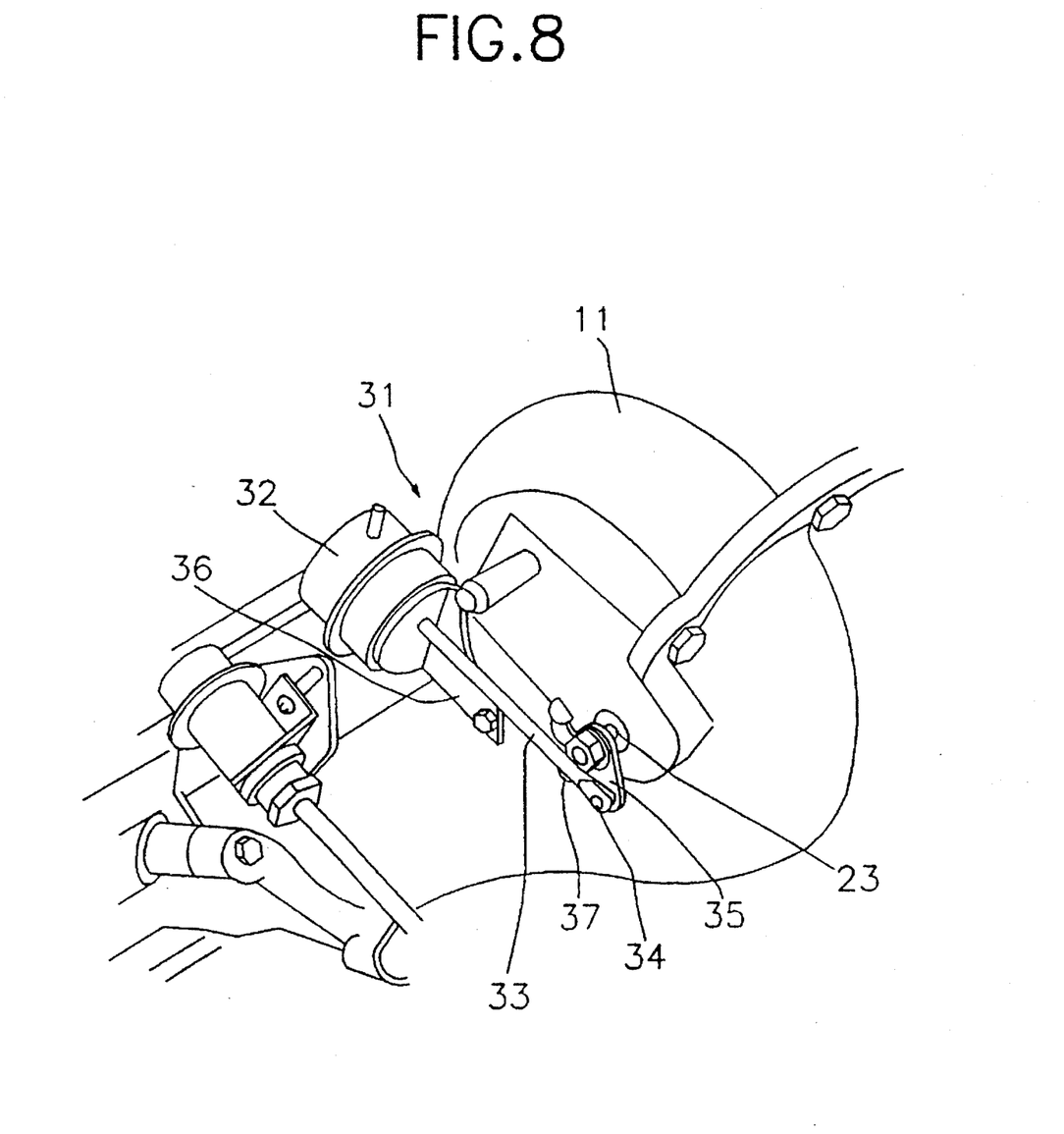
FIG. 8 is a perspective view showing that a driving mechanism for driving the intake control valve shaft according to the present invention is installed on the outer surface of the intake manifold.

In FIG. 8 showing the state that the intake control valve driving mechanism 31 is installed on the exterior surface of the manifold 11, the driving mechanism 31 comprises an actuator 32 incorporating a diaphragm (not shown) therein, a rod 33 being connected to the diaphragm of the actuator 32 and movable axially reciprocally and a lever 35 rotatably connected to the rod 33 at its one end by a pin 34 and fixed to the shaft 23 at its other end so as to be rotated by the movement of the rod 33 and to transmit a rotation force to the shaft 23. The actuator 32 is secured to a bracket 36 fixed to the outer surface wall of the intake manifold 11.

A stopper 37 for restricting a rotational range of the lever 35 is also disposed on the outer surface wall of the intake manifold 11 in order to control the opening degree of the intake control valve 20, when the lever 35 is rotated due to the axial movement of the rod 33.

Figure 9A:
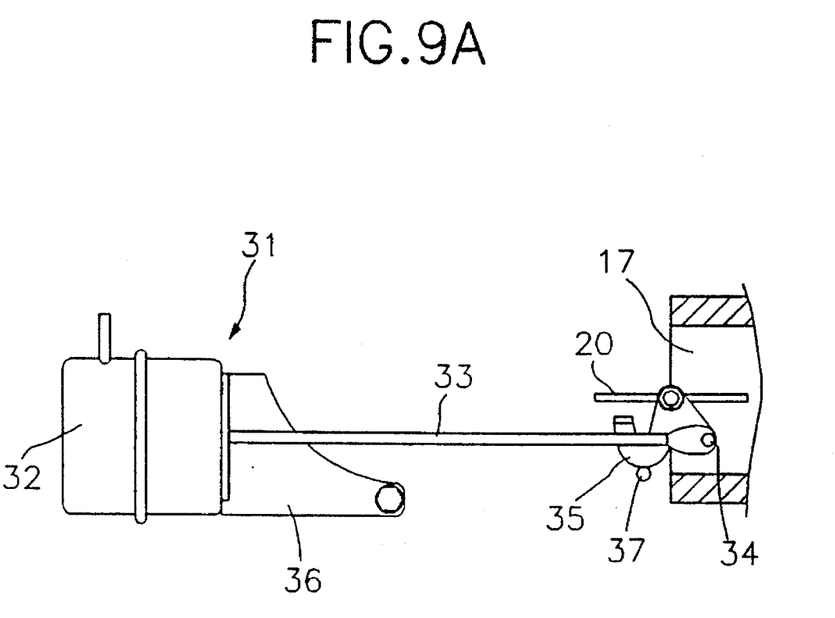
FIG. 9A is a schematic view showing that the intake control valve is in its opened position to open the intake passage by the driving mechanism of FIG. 8.
Figure 9B:
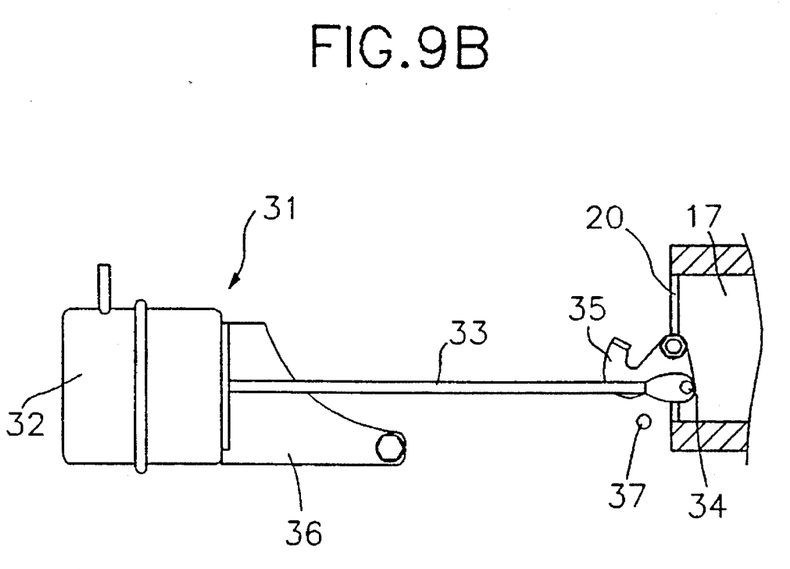
FIG. 9B is a schematic view showing that the intake control valve is in its closed position to close the intake passage by the driving mechanism.

FIGS. 9A and 9B illustrate an opened state and a closed state of the intake control valve 20, respectively.

Figure 10:
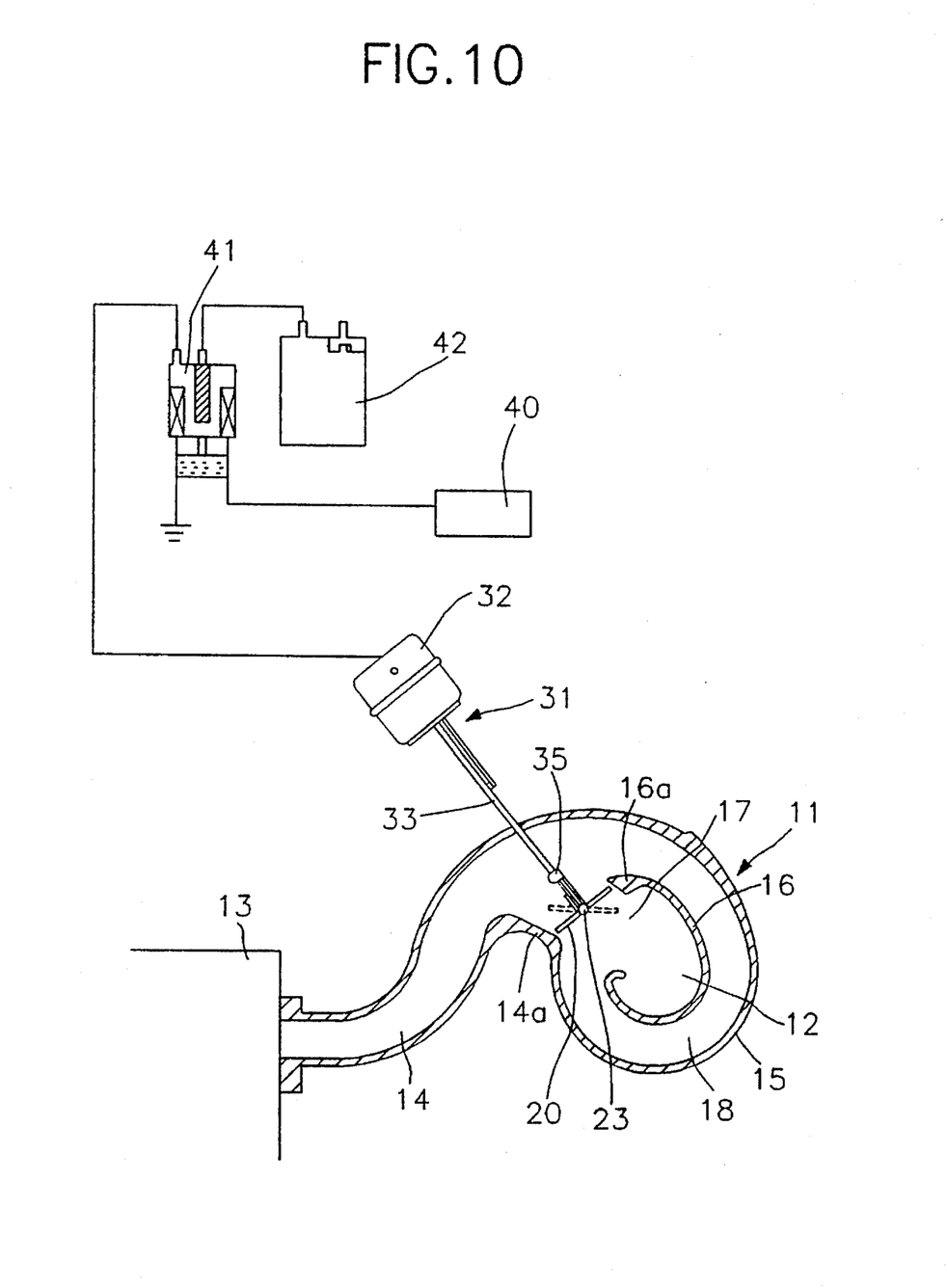
FIG. 10 is a schematic view showing the intake apparatus as a whole according to the present invention.

In FIG. 10, a solenoid valve 41 is energized by signals from an electronic control unit 40 connected to the engine 13, the signals being fluctuated by the revolutions of the engine 13, and the diaphragm of the actuator 32 is activated by the ON/OFF operation of vacuum in a vacuum tank 42, which operation is done by the solenoid valve 41, thereby to move the rod 33 axially and to rotate the lever 35 so that the intake control valve 20 may rotate in order to open or shut the first intake passage 17.

When the engine 13 operates at high speed, as shown in FIG. 9A, the intake control valve 20 is in the opened state, and thus air flows from the intake section 12 directly to the connecting passage 14 through the first intake passage 17, as shown in FIG. 7. On the other hand, when the engine 13 operates at low speed, as shown in FIG. 9B, the intake control valve 20 is in the closed state, and thus air flows from the intake section 12 to the connecting passage 14 through the second intake passage 18.

As described above, the intake apparatus of the engine according to the present invention can be manufactured with a simple structure and can enhance the intake efficiencies of the engine at low and high speeds by operating the intake control valve to close or open the first intake passage automatically in accordance with the variations of the revolutions of the engine, thereby to lengthen or shorten the intake passage.

Also, since the shaft to which several intake control valves are fixed comprises at least two unit shafts coupled to each other with a gap, an axial thermal expansion of the shaft due to the high heat of the engine can be absorbed thereby to prevent the contact or interference of the shaft with the inner surface wall of the intake manifold when operating the intake control valve.

Further, the driving mechanism for driving the intake control valve can be made compact, and accordingly reliability in operating the intake control valve is improved.

I claim:

1. An intake apparatus of an engine(13) having an intake manifold(11) wherein either a short intake passage or a long intake passage is selected in accordance with the revolutions of the engine(13), characterized in that an intake section(12) into which air flows from air cleaner is provided within the intake manifold(11), a partition wall(16) is installed concentrically with a circular intake manifold casing(15) surrounding the intake section(12) with respect to the intake section(12), between the intake manifold casing(15) and the intake section(12), an intake control valve(20) is switchably arranged between an upper end(16a) of the partition wall(16) and a bent portion(14a) of the intake manifold(11), characterized in that at least two unit shafts(23a) are spaced apart from and connected with each other to form a shaft(23) to which the intake control valve(20) is fixed, thereby to absorb axial thermal expansion of the shaft(23) due to high temperature of the engine(13), and characterized in that a driving mechanism(31) for driving the intake control valve(20) comprises an actuator(32) energized by a solenoid valve(41), a rod(33) connected to the actuator(32) so as to move axially and a lever(35) rotatably connected at its one end to the rod(33) by means of a pin(34) and secured at its other end to the shaft(23).

2. The intake apparatus as claimed in claim 1, characterized in that two unit shafts(23a) are connected with each other by means of a coupler(26).

3. The intake apparatus as claimed in claim 2, characterized in that each of the unit shafts(23a) is provided at one of the opposite ends thereof with a connection portion having a pair of semicircular protrusions(23b) which are apart from each other.

4. The intake apparatus as claimed in claim 3, characterized in that the actuator(32) incorporates a diaphragm therein, and the solenoid valve(41) is energized by signals from an electronic control unit(40) so as to turn the vacuum in a vacuum tank(42) ON or OFF, thereby to activate the diaphragm of the actuator(32).

5. The intake apparatus as claimed in claim 4, characterized in that the actuator(32) is secured to a bracket(36) fixed to an outer surface wall of the intake manifold(11), and a stopper(37) for restricting a rotational range of the lever(35) is disposed on the outer surface wall of the intake manifold(11) in order to control an opening degree of the intake control valve(20).

* * * * *